E. RANDALL.
Improvement in Lime-Kilns.
No. 129,985. Patented July 30, 1872.
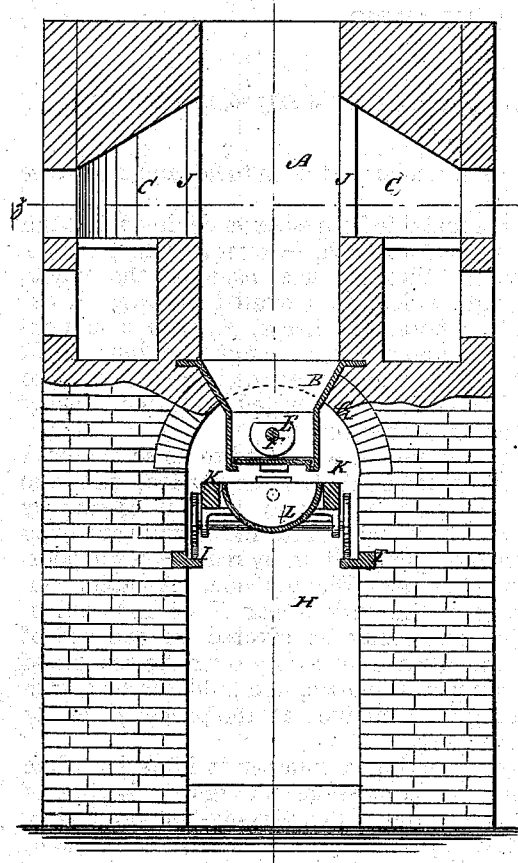
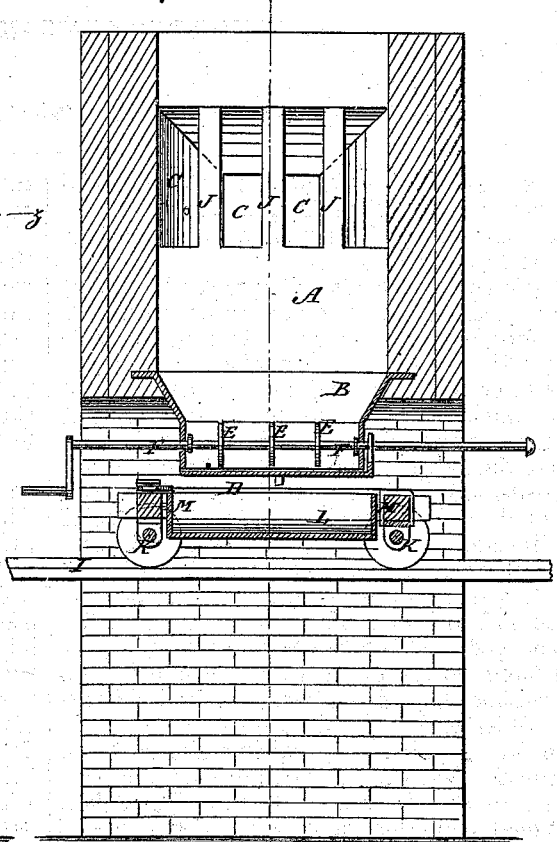
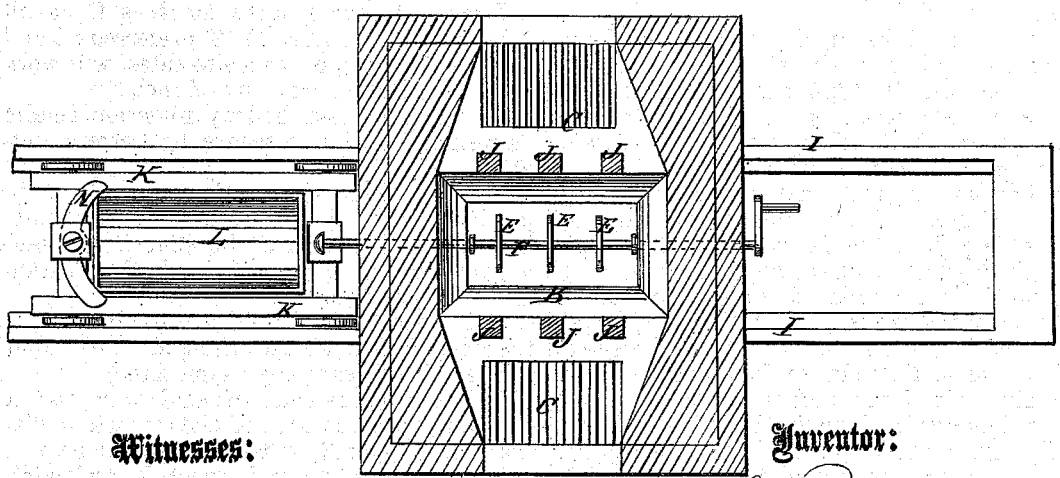

UNITED STATES PATENT OFFICE.

ELISHA RANDALL, OF MASON CITY, IOWA.

IMPROVEMENT IN LIMEKILNS.

Specification forming part of Letters Patent No. 129,985, dated July 30, 1872.

Specification describing a new and useful Improvement in Limekilns, invented by ELISHA RANDALL, of Mason City, county of Cerro Gordo, State of Iowa.

My invention consists of a metal hopper at the bottom of the cupola, with an open bottom for discharging and a slide for closing it; also with a revolving grate, with a hand-crank above the slide, adapted to pick the pieces of lime apart and facilitate the discharge of it by turning said grate. And a short distance above the hopper there are two fire-places on opposite sides of the cupola, arranged and adapted to act quickly on a large surface of the limestone, so as to expedite the burning without overburning any part. And below the hopper is an open archway through the stack and an elevated railway, on which the discharged lime is received in a truck, with a box mounted on journals and designed to be turned bottom side up by gravity for discharging, all as hereinafter described.

In the accompanying drawing, Figure 1 is a sectional elevation of my improved limekiln taken on the line $x\,x$ of Fig. 2. Fig. 2 is a sectional elevation taken on the line $y\,y$ of Fig. 1, and Fig. 3 is a horizontal section on the line $z\,z$ of Fig. 1.

Similar letters of reference indicate corresponding parts.

A represents the cupola or chamber of the stack, containing the limestone to be burned, and B the metallic hopper at the bottom. C represents the furnaces, of which there are two, opposite each other, at the sides of said chamber A, a short distance above the said hopper; said furnaces extending across the whole breadth of the sides of the cupola, where they join the latter, and being high enough to affect a direct application of heat to a much larger area of stone than can be done when the fire is made in the cupola, and is limited in the area to that of the cross-section of the said cupola, so that with a cupola of a given size I can reduce the stone much faster than can be done in the kilns as ordinarily constructed. Vertical grate-bars J are arranged at the junction of the furnaces with the cupola, to keep the stone from falling into the fire. The hopper has an open bottom closed with a slide, D, and above this is a revolving grate, consisting of the sectional disks E mounted on the crank-shaft F, which said disks are adapted, by their straight upper edges, to pick the lime to pieces and separate it when burned, so as to fall and discharge readily.

This metallic hopper extends down through the top of an arch, G, over a wide passage-way, H, through the base of the stack, through which an elevated railway, I, extends, whereon a truck, K, with a trough-shaped hopper-box, L, hanging on journals M at the ends, runs under the hopper to receive the lime as it is discharged to conduct it away to the lime store-house.

This hopper L is designed to be so mounted on the journals that, when loaded, one side will be the heavier, and cause it to turn by gravity, and when unloaded it will turn back to the upright position by reason of the journals being near the top side. A catch, consisting of the curved bar N or any equivalent thereof, may be pivoted on one end of the truck-frame to swing over the corners of the hopper, as shown, and hold the box from turning till it arrives at the proper place for discharging.

By arranging a number of kilns in a line with an open passage through the bottom of the stack and a discharging-hopper, I may extend the railway from one to another, and thus utilize one road and car for discharging and conveying the lime from all the kilns.

I may, of course, have furnaces C on all sides of the chamber A, if preferred; but I believe that two, on opposite sides, will work with the greatest economy of fuel.

Having thus described my invention, I claim as new and desire to secure by Letters Patent—

1. The combination of the cast-metal hopper B and revolving grate E F with the cupola or burning stack and the slide D, the said hopper projecting through arch G, substantially as specified.

2. The stack of a limekiln provided with a passage, H, through the base and an elevated railway, I, substantially as specified.

3. The arrangement of said way and a truck, K, with the base of the stack and discharging-hopper B, substantially as shown.

4. The tilting-hopper L, truck K, and latch N, constructed and arranged substantially as specified.

ELISHA RANDALL.

Witnesses:
LORENZO L. HUNTLEY,
ELLIS L. HUNTLEY.